United States Patent
Rossiello et al.

(10) Patent No.: US 12,423,523 B2
(45) Date of Patent: Sep. 23, 2025

(54) GENERATING SEMANTIC TRIPLETS FROM UNSTRUCTURED TEXT USING NAMED ENTITIES

(71) Applicant: International Business Machines Corporation, Armonk, NY (US)

(72) Inventors: Gaetano Rossiello, Brooklyn, NY (US); Alfio Massimiliano Gliozzo, Brooklyn, NY (US); Nandana Sampath Mihindukulasooriya, Dublin (IE); Faisal Mahbub Chowdhury, Woodside, NY (US); Michael Robert Glass, Bayonne, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 310 days.

(21) Appl. No.: 18/080,872

(22) Filed: Dec. 14, 2022

(65) Prior Publication Data
US 2024/0202447 A1 Jun. 20, 2024

(51) Int. Cl.
*G06F 40/295* (2020.01)
*G06F 16/334* (2025.01)
(Continued)

(52) U.S. Cl.
CPC ........ *G06F 40/295* (2020.01); *G06F 16/3344* (2019.01); *G06F 40/103* (2020.01);
(Continued)

(58) Field of Classification Search
CPC ...... G06F 40/20; G06F 40/237; G06F 40/242; G06F 40/279; G06F 40/284;
(Continued)

(56) References Cited

U.S. PATENT DOCUMENTS 9,454,957 B1 * 9/2016 Mathias ................ G06F 40/295
10,431,205 B2 10/2019 Le et al.
(Continued)

OTHER PUBLICATIONS

Wang et al., Can Generative Pre-trained Language Models Serve as Knowledge Bases for Closed-book QA?, Jun. 3, 2021, (11 pages).
(Continued)

*Primary Examiner* — Martin Lerner
(74) *Attorney, Agent, or Firm* — Garg Law Firm, PLLC; Rakesh Garg; Steven Bouknight

(57) ABSTRACT

An embodiment includes generating a training dataset by aligning text from a document of a document database with a named entity from a knowledge base. The embodiment generates an enhanced training dataset by updating the training dataset to include a named entity type and a named entity label associated with the named entity. The embodiment trains a natural language processing (NLP) model using the enhanced training dataset resulting in a trained NLP model. The embodiment identifies, using the trained NLP model, the named entity in a block of unstructured text and generates, using the trained NLP model, a target sequence that includes a relationship between the named entity and a tail entity, as well as the named entity type and the named entity label of the named entity and a tail entity type and a tail entity label of the tail entity.

18 Claims, 9 Drawing Sheets

(51) Int. Cl.
*G06F 40/103* (2020.01)
*G06F 40/126* (2020.01)
*G06F 40/30* (2020.01)
*G06F 40/40* (2020.01)
*G06N 3/0455* (2023.01)
*G06N 5/02* (2023.01)

(52) U.S. Cl.
CPC ............ *G06F 40/126* (2020.01); *G06F 40/30* (2020.01); *G06F 40/40* (2020.01); *G06N 5/02* (2013.01)

(58) Field of Classification Search
CPC .... G06F 40/295; G06F 40/30; G06F 16/2452; G06F 16/24522; G06N 3/0455; G06N 3/0475; G06N 3/088; G06N 3/0895
USPC ....... 704/1, 9, 10; 706/12, 20; 707/759, 760, 707/761
See application file for complete search history.

(56) References Cited

U.S. PATENT DOCUMENTS

| | | | | |
|---|---|---|---|---|
| 10,445,356 | B1* | 10/2019 | Mugan | G06F 40/30 |
| 10,607,042 | B1* | 3/2020 | Dasgupta | G06F 40/295 |
| 10,867,595 | B2 | 12/2020 | Sriram et al. | |
| 11,151,982 | B2 | 10/2021 | Tomkins et al. | |
| 11,238,845 | B2 | 2/2022 | Chen et al. | |
| 11,790,411 | B1* | 10/2023 | Mann | G06F 40/284 704/9 |
| 2017/0177715 | A1* | 6/2017 | Chang | G06F 40/186 |
| 2017/0308571 | A1* | 10/2017 | McCurley | G06F 16/248 |
| 2019/0354582 | A1* | 11/2019 | Schafer | G06F 40/295 |
| 2020/0073787 | A1* | 3/2020 | Saha | G06F 16/245 |
| 2021/0110113 | A1* | 4/2021 | Brousseau | G06F 40/295 |
| 2021/0216719 | A1* | 7/2021 | Mahindru | G06F 40/295 |
| 2022/0067278 | A1* | 3/2022 | Huang | G06F 40/30 |
| 2022/0198146 | A1* | 6/2022 | Ding | G06F 40/295 |
| 2022/0415203 | A1* | 12/2022 | Khan | G06F 40/30 |
| 2023/0076127 | A1* | 3/2023 | Yu | G06F 40/295 |

OTHER PUBLICATIONS

Schick et al., Generating Datasets with Pretrained Language Models, 2021 Conference on Empirical Methods in Natural Language Processing, pp. 6943-6951, Nov. 7-11, 2021.

Yang et al., Exploring Pre-trained Language Models for Event Extraction and Generation, 57th Annual Meeting of the Association for Computational Linguistics, pp. 5284-5294, Jul. 28-Aug. 2, 2019.

No Author, Data-Efficient Information Extraction from Documents with Pre-Trained Language Models, May 31, 2021, (9 pages).

ip.com, Human Assisted Methods for Generating and Labelling Data for the Supervised Training of Word and Sentence Embedding Models, Jun. 2, 2022, (7 pages).

ip.com, System and Method for Generatively Extracting Pertinent Structured Information from Documents Using Contextual Information, Mar. 16, 2022, (7 pages).

ip.com, Recognizing Semantic Formatting Information in a Document, Dec. 13, 2017, (35 pages).

Carlson et al., Toward an Architecture for Never-Ending Language Learning, Twenty-Fourth AAAI Conference on Artificial Intelligence, AAAI 2010, Atlanta, Georgia, USA, Jul. 11-15, 2010, (8 pages).

Cabot et al., REBEL: Relation Extraction By End-to-end Language generation, Findings of the Association for Computational Linguistics: EMNLP 2021, pp. 2370-2381, Nov. 7-11, 2021.

Zhong et al., A Frustratingly Easy Approach for Entity and Relation Extraction, 2021 Conference of the North American Chapter of the Association for Computational Linguistics: Human Language Technologies, pp. 50-61 Jun. 6-11, 2021.

De Cao et al., Autoregressive Entity Retrieval, ICLR 2021, Mar. 24, 2021, (20 pages).

Dobrovolskii, Word-Level Coreference Resolution, Sep. 9, 2021, (6 pages).

Josifoski et al., GenIE: Generative Information Extraction, Apr. 13, 2022, (19 pages).

Hoffart et al., YAGO2: A spatially and temporally enhanced knowledge base from Wikipedia, Artificial Intelligence vol. 194, pp. 28-61, Jan. 2013.

Niu et al., DeepDive: Web-scale Knowledge-base Construction using Statistical Learning and Inference, VLDS'12, Aug. 31, 2012, (4 pages).

Dong et al., Knowledge Vault: A Web-Scale Approach to Probabilistic Knowledge Fusion, 2014, (10 pages).

Rossiello et al., Generative Relation Linking for Question Answering Over Knowledge Bases, Aug. 16, 2021, (12 pages).

Yao et al., KG-BERT: Bert for Knowledge Graph Completion, Sep. 11, 2019, (8 pages).

Glass et al., Robust Retrieval Augmented Generation for Zero-shot Slot Filling, Sep. 14, 2021, (11 pages).

Glass et al., Re2G: Retrieve, Rerank, Generate, Jul. 13, 2022, (15 pages).

Rossiello et al., KnowGL: Knowledge Generation and Linking from Text, Nov. 22, 2022, (3 pages).

Van Harmelen et al., Handbook of Knowledge Representation, Foundations of Artificial Intelligence, 2008, (294 pages).

Goasduff, The 4 Trends That Prevail on the Gartner Hype Cycle for AI, 2021, Gartner, Sep. 22, 2021, https://www.gartner.com/en/articles/the-4-trends-that-prevail-on-the-gartner-hype-cycle-for-ai-2021, (9 pages).

* cited by examiner

GENERATING SEMANTIC TRIPLETS FROM UNSTRUCTURED TEXT USING NAMED ENTITIES

BACKGROUND

The present invention relates generally to knowledge extraction. More particularly, the present invention relates to a method, system, and computer program for generating semantic triplets from unstructured text.

Unstructured text refers to text written in natural language, such as text in documents, messages, social media postings, and the like. Natural language refers to a language used by humans to communicate, as distinct from a language used by humans to communicate with machines, or a language used by machines to communicate with each other. Natural language can be contrasted with structured text in that structured text is arranged according to a pre-defined data model or is organized in a pre-defined manner, such as stored in fielded form in a database or semantically tagged in a document.

Unstructured text can often be an important source of knowledge. However, such knowledge is much more easily found, used, and augmented when converted to a structured format for storage and use. For example, such knowledge is more accessible when structured in a knowledge base. There is therefore a great amount of interest in developing fast and accurate technologies that can automate the process of extracting knowledge from unstructured text and implementing the extracted knowledge in a structured format.

SUMMARY

The illustrative embodiments provide for generating semantic triplets from unstructured text. An embodiment includes generating a training dataset by aligning text from a document of a document database with a named entity from a knowledge base. The embodiment also includes generating an enhanced training dataset by updating the training dataset to include a named entity type and a named entity label associated with the named entity. The embodiment also includes training a natural language processing (NLP) model using the enhanced training dataset resulting in a trained NLP model. The embodiment also includes identifying, using the trained NLP model, the named entity in a block of unstructured text. The embodiment also includes generating, using the trained NLP model, a target sequence that includes a relationship between the named entity and a tail entity, where the target sequence includes the named entity type and the named entity label of the named entity and includes a tail entity type and a tail entity label of the tail entity. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

DETAILED DESCRIPTION

Figure 1:
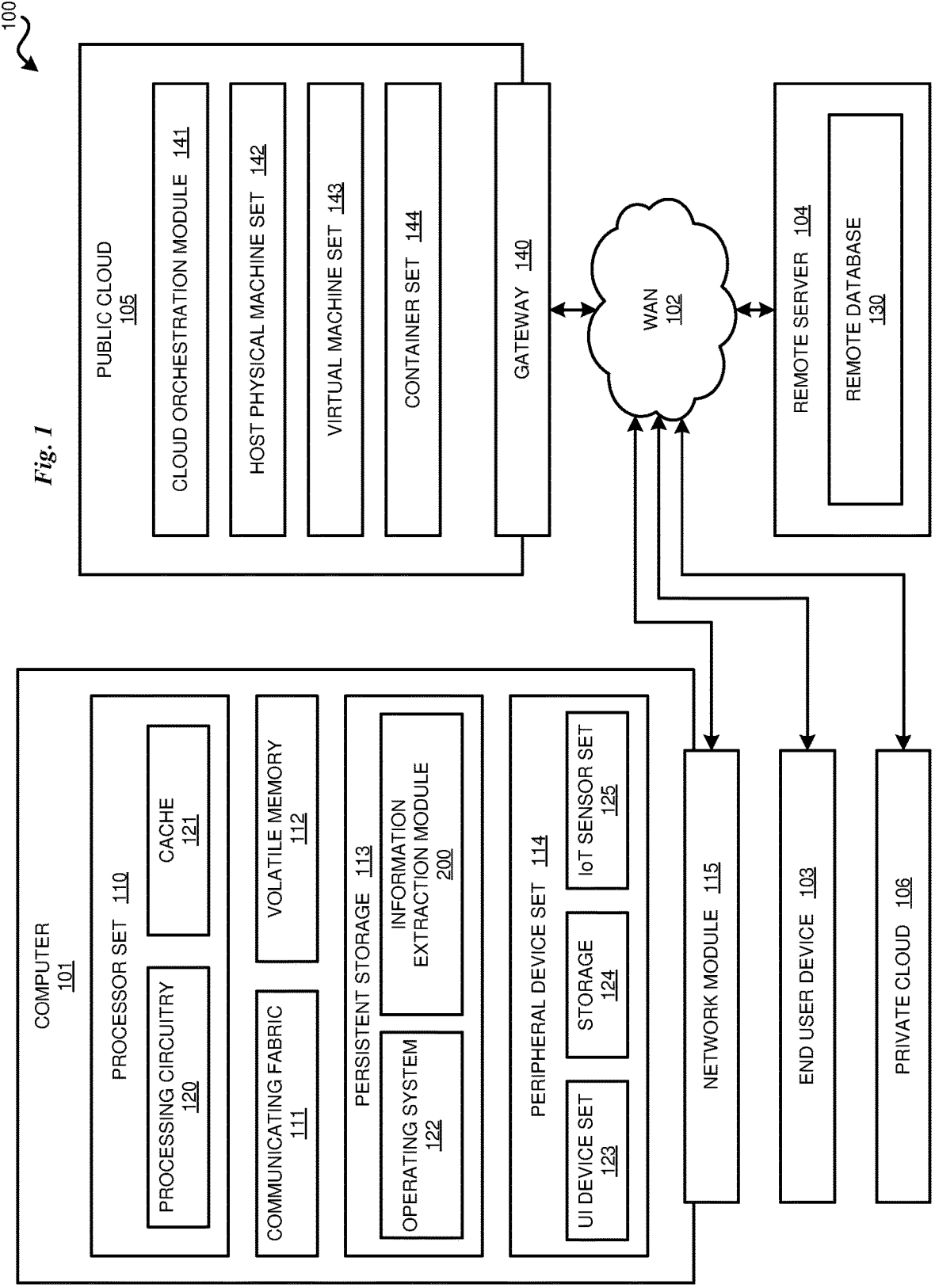
FIG. 1 depicts a block diagram of a computing environment in accordance with an illustrative embodiment.

Information extraction is a key step in converting unstructured text into structured data, and analyzing unstructured text. Information extraction typically involves multiple subtasks, such as named entity recognition (NER) (also known as entity identification, entity chunking or entity extraction) and relation extraction (RE).

NER seeks to locate named entity mentions in unstructured text and classify the mentions into pre-defined categories. NER tags words or phrases in the unstructured text with named entity designations, such as the person names, organizations, locations, medical codes, time expressions, quantities, monetary values, percentages, etc.

RE seeks to extract semantic relationships from unstructured text, particularly where the semantic relationships are between the located named entities. The extracted relationship may itself fall into a number of semantic categories, e.g., married to, employed by, lives in, happened during, etc. RE produces relation labels for the different semantic categories of the extracted relationship.

Traditionally, information extraction is accomplished using an information extraction pipeline in which NER and RE are accomplished using separate models and different techniques. For example, an information extraction pipeline may perform NER using a bi-directional recurrent neural network (RNN) for sequential encoding and a conditional random field (CRF) network for decoding. On the other hand, the information extraction pipeline may perform the RE task using a syntactic dependency parser to exploit the dependency relations among words in context. However, a problem with this approach is that NER and RE are applied in sequence, i.e., NER is performed first, and the results are used as inputs to the RE task. As a result, previous approaches that employ such pipeline methods are prone to error accumulation and error propagation. In addition, such previous approaches are only applicable to very limited numbers of entities and relations, making them impractical for many applications, such as applications in which the unstructured text includes a wide variety of topics.

The disclosed embodiments address and provide a solution to this technical problem using an approach that introduces a unified generative framework that does not require implementation of ad hoc architectures for individual tasks. Exemplary embodiments disclose a process that converts unstructured text into structured data represented as a set of assertion box (ABox) assertions compliant with the terminology box (TBox) of a given knowledge graph (KG).

The axioms in an ontology can broadly be separated into two groups (TBox and ABox). TBox axioms are general statements about the domain being modeled. They typically do not describe properties of particular objects; instead, they describe properties of all objects of a particular type. For example, the statement that "every hotel is a kind of an accommodation" is a typical TBox axiom. ABox axioms are statements, usually in the form of a semantic triple (or more simply referred to herein as a "triple"), about particular objects. A semantic triple is a set of three entities that codifies a statement about semantic data in the form of subject-predicate-object expressions (e.g., "Bob is 35", or "Bob knows John"). For example, the statement that "Savoy is a hotel" is a typical ABox axiom. ABox axioms are often synonymously called facts.

TBox axioms can be further split into two subgroups with respect to how they are used during inferencing. A first group of axioms can be used to infer new facts. For example, given the fact that "a square is a quadrilateral," the TBox axiom stating that "every quadrilateral is a kind of polygon" can be used to derive the fact that "a square is a kind of polygon." A second group of axioms specify what constitutes valid data; such axioms are called integrity constraints. For example, the integrity constraint that "the set of circles and squares is disjoint" can be used to detect an error in an ontology containing statements that "the shape is a circle" and "the shape is a square." Some TBox axioms belong to both groups; that is, their formal meaning is part inference rule and part integrity check.

The disclosed systems and methods use a trainable sequence-to-sequence model (BART) deep learning network for NER and RE. The disclosed systems and methods can be used for processing unstructured texts. For example, they can be applied to construct a medical report or conduct medical record mining by extracting information from unstructured texts in medical records. Two learning tasks, a NER and a RE, are performed conjunctively to reduce error propagation and improve performance.

In an illustrative embodiment, a training process generates a training dataset by aligning text from a document of a document database with a named entity from a knowledge graph. In some such embodiments, the training process generates a training dataset by aligning text from a document of a document database with a pair of entities (i.e., a named entity and a tail entity) from a knowledge graph. In some embodiments, the process uses a distance supervision technique that automatically aligns text from documents of the document database with named entities from the knowledge base. In some such embodiments, the distance supervision technique automatically aligns text from documents of the document database with semantic triplets from the knowledge base, where the semantic triplets include named entities as subject entities and object entities of the semantic triplets.

In some embodiments, the training process generates an enhanced training dataset by updating the training dataset to include a named entity type and a named entity label associated with the named entity. In some embodiments, the process generates the enhanced training dataset using a distance supervision technique that automatically updates the training dataset to include the named entity type and the named entity label. In some such embodiments, the distance supervision technique automatically updates the training dataset by querying the knowledge base for the named entity, retrieving the named entity type and the named entity label from the knowledge base, and associating the named entity type and the named entity label with the named entity.

In some embodiments, information extraction is cast as a translation task where an NLP model comprises a sequence-to-sequence model that is trained using an alignment between unstructured text of a document database and semantic triples of a knowledge base. In some embodiments, the training data comprises a distantly supervised dataset that comprises alignments of unstructured text abstracts of the Wikipedia® online encyclopedia with knowledge base facts represented in triples in the Wikidata® knowledge base (Wikipedia and Wikidata are registered trademarks of Wikimedia Foundation, Inc.). In some such embodiments, the resulting dataset is then extended by adding the entity labels and their types from Wikidata for each entity surface form in the text of the Wikipedia abstracts. In some such embodiments, the aligning of the unstructured text abstracts with the KB triples comprises generating alignment data that maps unstructured text to corresponding triples identified using Wikidata Uniform Resource Identifiers (URIs).

In some embodiments, the training process trains a natural language processing (NLP) model using the enhanced training dataset resulting in a trained NLP mode. In some embodiments, the NLP model comprises a sequence-to-sequence model comprising an encoder and a decoder.

In some embodiments, the training process uses a machine-learning technique to generate an NLP model. The training process performs this task by iteratively generating a set of parameter values that collectively define the NLP model. Once trained, the NLP model is used to input a block of unstructured text, such as a sentence, and generate a corresponding full set of semantic annotations that are compliant with the terminology of a knowledge graph (KG).

In an illustrative embodiment, an information extraction process identifies, using the trained NLP model, the named entity in a block of unstructured text. In some embodiments, the block of unstructured text is a sentence. In some such embodiments, the process extracts the sentence from the unstructured text.

In some embodiments, the information extraction generates, using the trained NLP model, a target sequence that includes a relationship between the named entity and a tail entity, the named entity type, the named entity label, a tail entity type, and a tail entity label. In some embodiments, the process generates the target sequence by using the encoder to generate a numeric representation of a word from the block of unstructured text, and then using the decoder to generate the target sequence as a prediction of the relationship based at least in part on the numeric representation of the word.

In some embodiments, the process formats the target sequence according to a predefined schema that specifies an arrangement of the target sequence. In some embodiments, the predefined schema specifies the arrangement to include the named entity, followed by the named entity type, followed by the named entity label, followed by the relationship, followed by the tail entity, followed by the tail entity type, and followed by the tail entity label.

In some embodiments, the process then validates the target sequence. In some such embodiments, the process validates the target sequence using a classifier model that analyzes the relationship and outputs an indication of an accuracy of the relationship. In some alternative embodiments, the process validates the target sequence by translating the target sequence into a natural language statement, issuing a query to the document database for a string of text that matches, or is similar to, the natural language statement, and then generating a validation result based on a comparison of the natural language statement to the query result.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved information extraction module 200 that generates semantic triplets from unstructured text. In addition to information extraction module 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and information extraction module 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in information extraction module 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in information extraction module 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
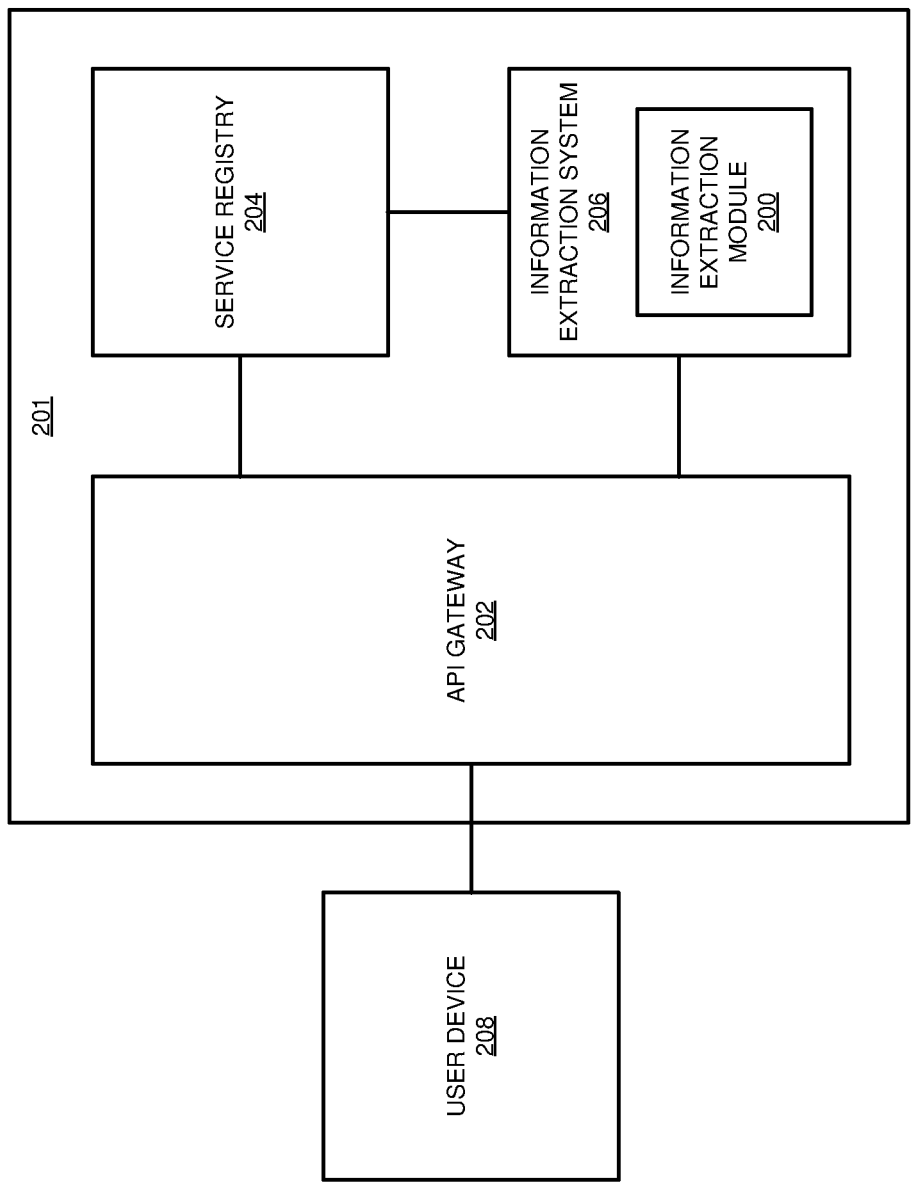
FIG. 2 depicts a block diagram of an example service infrastructure in accordance with an illustrative embodiment.

With reference to FIG. 2, this figure depicts a block diagram of an example service infrastructure 201 in accordance with an illustrative embodiment. In the illustrated embodiment, the service infrastructure 201 includes an information extraction system 206. In an embodiment, the information extraction system 206 is an example of the computer 101 of FIG. 1 and includes the information extraction module 200 of FIG. 1.

In the illustrated embodiment, the service infrastructure 201 provides services and service instances to a user device 208. User device 208 communicates with service infrastructure 201 via an API gateway 202. In various embodiments, service infrastructure 201 and its associated information extraction system 206 serve multiple users and multiple tenants. A tenant is a group of users (e.g., a company) who share a common access with specific privileges to the software instance. Service infrastructure 201 ensures that tenant specific data is isolated from other tenants.

In the illustrated embodiment, service infrastructure 201 includes a service registry 204. In some embodiments, the information extraction system 206 is a virtual machine and the service registry 204 looks up service instances of information extraction system 206 in response to a service lookup request such as one from API gateway 202 in response to a service request from user device 208. For example, in some embodiments, the service registry 204 looks up service instances of information extraction system 206 in response to requests related to information extraction from the user device 208.

In some embodiments, service registry 204 maintains information about the status or health of each service instance including performance information associated each of the service instances. In some such embodiments, such information may include various types of performance characteristics of a given service instance (e.g., cache metrics, etc.) and records of updates.

In some embodiments, user device 208 connects with API gateway 202 via any suitable network or combination of networks such as the Internet, etc. and uses any suitable communication protocols such as Wi-Fi, Bluetooth, etc. Service infrastructure 201 may be built on the basis of cloud computing. API gateway 202 provides access to client applications like the information extraction module 200. API gateway 202 receives service requests issued by client applications and creates service lookup requests based on service requests. As a non-limiting example, in an embodiment, the user device 208 executes a routine to initiate interaction with the information extraction module 200. For instance, in some embodiments, the user accesses the information extraction module 200 directly using a command line or GUI. Also, in some embodiments, the user accesses the information extraction module 200 indirectly through the use of a web application that interacts with the information extraction module 200 via the API gateway 202.

Figure 3:
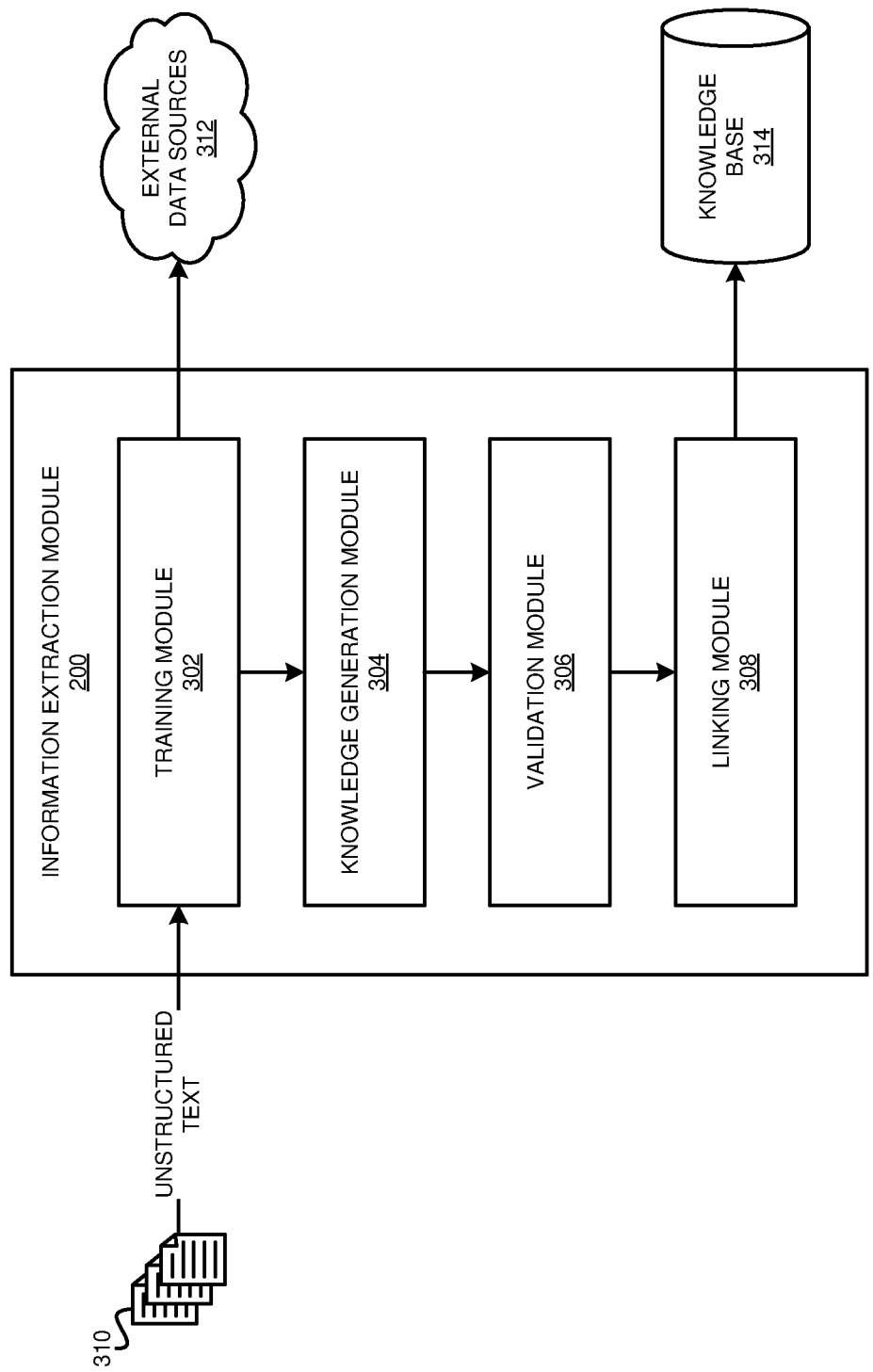
FIG. 3 depicts a functional block diagram of an exemplary secure debugging module in accordance with an illustrative embodiment.

With reference to FIG. 3, this figure depicts a functional block diagram of an exemplary information extraction module 200 in accordance with an illustrative embodiment. In the illustrated embodiment, the information extraction module 200 receives unstructured text from one or more documents 310, extracts knowledge from the unstructured text, and updates a knowledge base 314 with the extracted knowledge.

In the illustrated embodiment, the information extraction module 200 includes a training module 302, a knowledge generation module 304, a validation module 306, and a linking module 308. The training module 302 trains a natural language processing model using training data from one or more external data sources 312. In alternative embodiments, the information extraction module 200 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the training module 302 generates a training dataset by aligning unstructured text with named entities from a knowledge graph retrieved from external data sources 312. In some embodiments, the training module 302 then generates an enhanced training dataset by updating the training dataset to include a named entity type and a named entity label associated with each of the named entities. In some embodiments, the training module 302 uses the enhanced training dataset to train an NLP model.

Once the NLP model is trained, the knowledge generation module 304 uses the trained NLP model to input a block of unstructured text, such as a sentence, and generate a target sequence that comprises a corresponding full set of semantic annotations that are compliant with the terminology of a knowledge base 314. The target sequence is then passed to the validation module 306, which verifies the accuracy of the target sequence. If the accuracy is above a threshold level, then the linking module 308 links the target sequence to the knowledge base 314 by retrieving identifiers associated with the generated entity, type, and relation labels from the knowledge base 314 and associating the with the target sequence.

Figure 4:
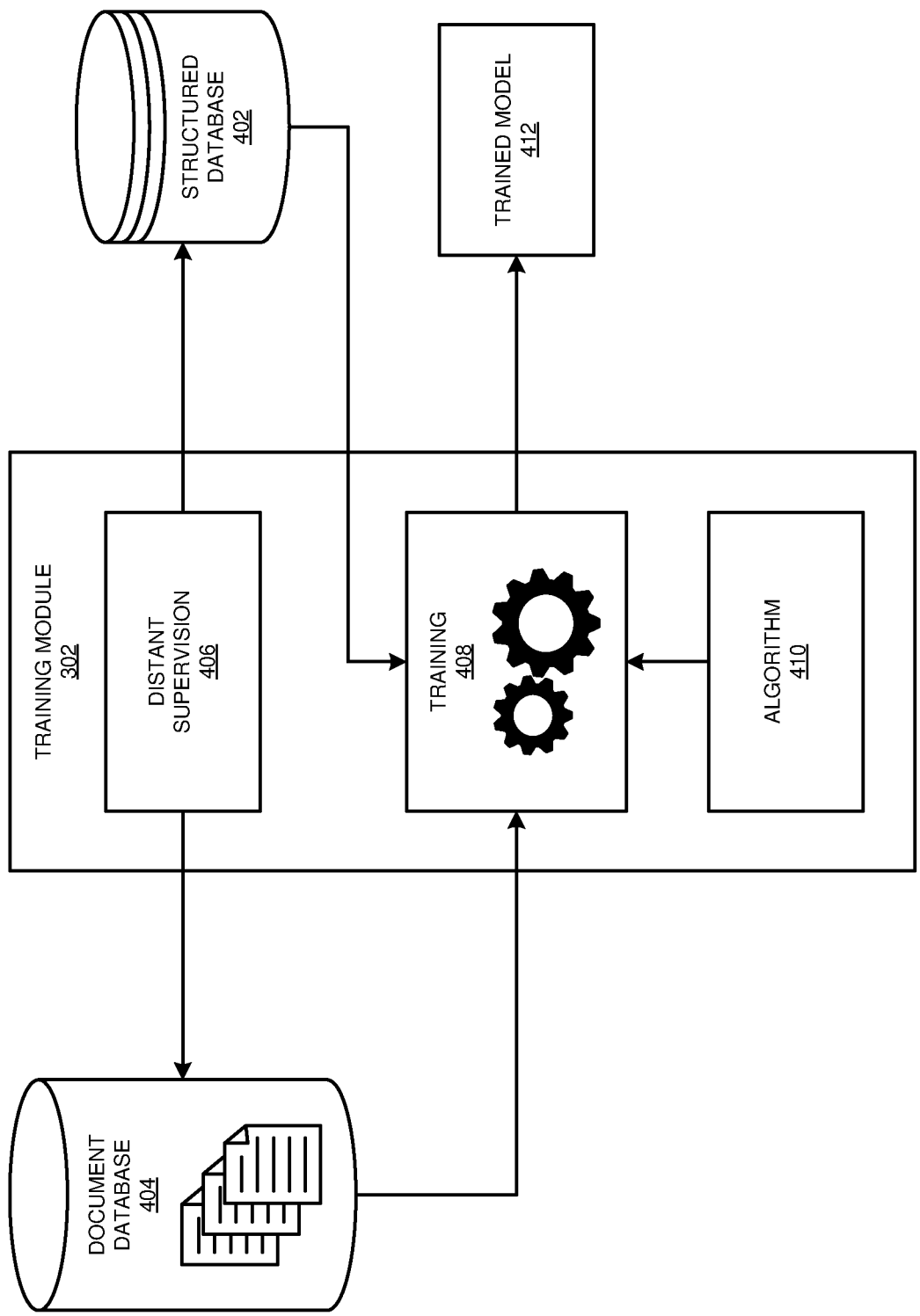
FIG. 4 depicts a functional block diagram of an exemplary training module in accordance with an illustrative embodiment.

With reference to FIG. 4, this figure depicts a functional block diagram of an exemplary training module 302 in accordance with an illustrative embodiment. In the illustrated embodiment, the training module 302 trains an NLP model using training data from a structured database 402 and a document database 404.

In the illustrated embodiment, the training module 302 includes a distant supervision module 406 and a training engine 408 that trains an NLP algorithm 410. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, information extraction is cast as a translation task. In some such embodiments, the algorithm 410 is a sequence-to-sequence algorithm that is trained by the training engine 408. The training engine 408 generates a trained model 412. In some embodiments, the trained model 412 is a sequence-to-sequence model. In some embodiments, the trained model 412 is a sequence-to-sequence model built from a pre-trained language model, such as BART (Bidirectional Auto-Regressive Transformer) or T5 (Text-to-Text Transfer Transformer).

In the illustrated embodiment, the training engine 408 trains the trained model 412 using a distantly supervised dataset for relation extraction built by the distant supervision module distant supervision 406. The distant supervision module 406 aligns or maps unstructured text from documents of the document database 404 to semantic triples from the structured database 402. For example, in some embodiments, the distant supervision module 406 aligns unstructured text from Wikipedia abstracts with Wikidata semantic triples. In some such embodiments, the resulting dataset is then extended by adding the entity labels and their types from Wikidata for each entity surface form in the text of the Wikipedia abstracts. In some such embodiments, the aligning of the unstructured text abstracts with the KB triples comprises generating alignment data that maps unstructured text to corresponding triples identified using Wikidata Uniform Resource Identifiers (URIs).

In some embodiments, the training engine 408 uses a machine-learning technique to generate the trained model 412. The training engine 408 performs this task by iteratively generating a set of parameter values that collectively define the trained model 412. The trained model 412 is used to input a block of unstructured text, such as a sentence, and generate a corresponding full set of semantic annotations that are compliant with the terminology of a knowledge graph (KG).

Figure 5:
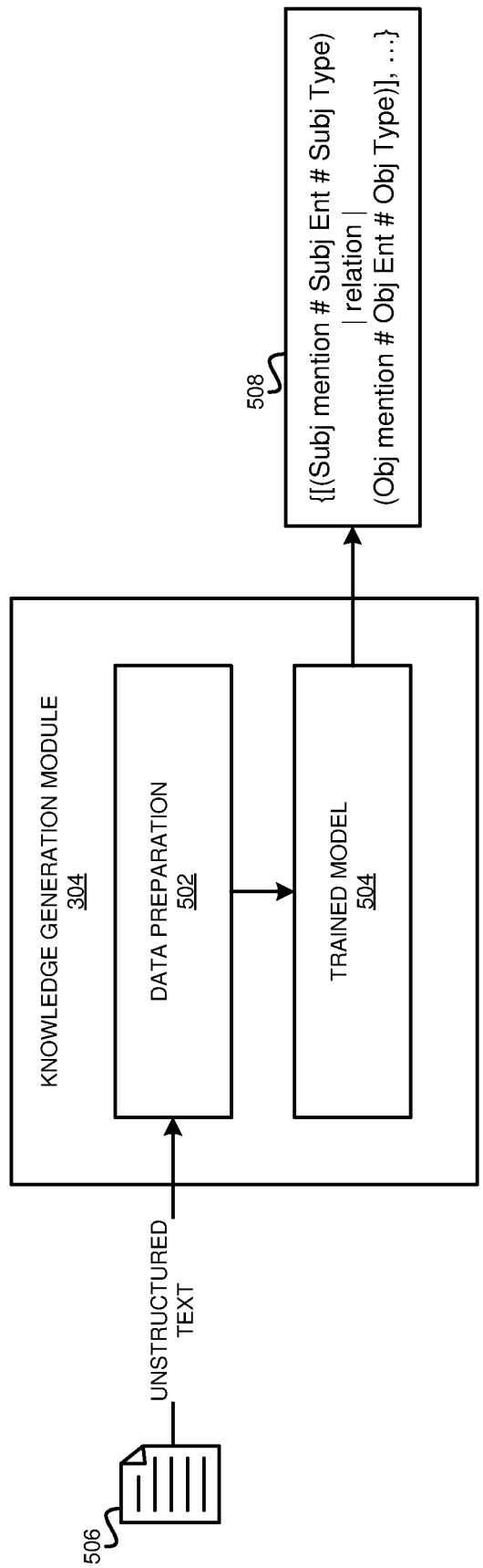
FIG. 5 depicts a functional block diagram of a knowledge generation module in accordance with an illustrative embodiment.

With reference to FIG. 5, this figure depicts a functional block diagram of a knowledge generation module 304 in accordance with an illustrative embodiment. In the illustrated embodiment, the knowledge generation module 304 receives unstructured text and uses a trained model 504 that was trained by the training module 302 to output a target sequence 508.

In the illustrated embodiment, the knowledge generation module 304 includes a data preparation module 502 and a trained model 504. In alternative embodiments, the knowledge generation module 304 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, the data preparation module 502 pre-processes the unstructured text data from the document 506. In some such embodiments, the data preparation module 502 structures the unstructured text data to make best use of the trained model 504. In some embodiments, the data preparation 502 performs one or more text preprocessing tasks, such as tokenization, normalization, and/or noise removal. For example, in some embodiments, the data preparation 502 performs tokenization by splitting strings of text into sentences or words. In some embodiments, the data preparation 502 performs normalization by converting characters to lowercase, converting accented characters to ASCII characters, and expanding contractions. In some embodiments, the data preparation 502 performs noise removal by removing extra whitespaces, stopwords, and special characters.

The preprocessed text is then inputted into the trained model 504. The trained model 504 converts unstructured text into structured data. In some embodiments, the structured data output from the trained model 504 is represented as a set of ABox assertions compliant with the TBox of Wikidata. In some embodiments, the input to the trained model 504 is tokenized by the data preparation 502 into sentences and the output from the trained model 504 is a target sequence 508 comprising a set of facts that are formatted according to a predefined schema. Thus, the trained model 504, given a sentence, detects pairs of entity mentions and jointly generates a set of facts (i.e., <Subject (Subject Type), relation, Object (Object Type) >) representing entity labels, entity types, and their relationships. In some embodiments, the outputs of the trained model 504 are deterministically converted into Resource Description Framework (RDF) statements.

In some embodiments, the trained model 504 is configured to output the target sequence 508 according to the following schema to represent the semantic annotations of a triple: [(subject mention #subject label #subject type)|relation label|(object mention #object label #object type)]. If the input text contains multiple entity mention pairs, the linearized target representations are concatenated using a separator character, such as a dollar sign ($), and the facts are sorted by the order of the appearances of the head entities in the input text. Thus, the trained model 504 generates surface forms, entity labels, and type information for both head and tail entities in the target representation. This represents a full set of semantic annotations, i.e., ABox and TBox, to construct and populate a KG with new facts.

Figure 6:
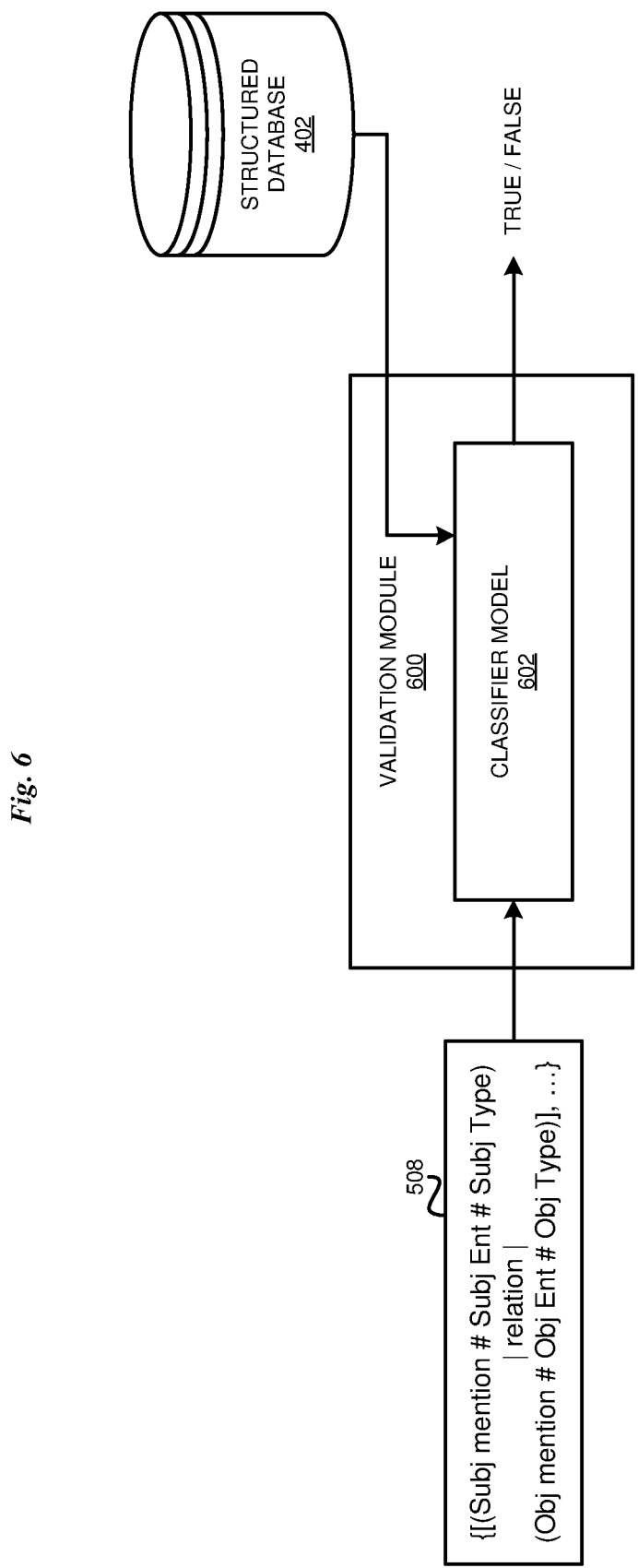
FIG. 6 depicts a functional block diagram of an exemplary validation module in accordance with an illustrative embodiment.

With reference to FIG. 6, this figure depicts a functional block diagram of an exemplary validation module 600 in accordance with an illustrative embodiment. In the illustrated embodiment, the validation module 600 uses a classifier model 602 to validate a target sequence 508 output by the knowledge generation module 304.

In the illustrated embodiment, validation of the target sequence 508 is implemented as a classification task using the classifier model 602. The classifier model 602 is trained to predict if a fact is true or false. In some embodiments, the classifier model 602 encodes the target sequence 508 into a feature vector of numerical values, and the structured database 402 provides semantic triples that are each similarly encoded either by the structured database 402 or by the validation module 600. In some such embodiments, the classifier model 602 compares the feature vector to the vector representations of the triples from the structured database 402 and generates an output score based on a proximity between the feature vector and a closest one of the vector representations of the triples in a vector space, where the proximity may be determined using a known technique, such as cosine similarity or Euclidean distance.

Thus, in some embodiments, the classifier model 602 is trained using the structured database 402 to evaluate the validity of a target sequence 508 and output a probability score that is indicative of whether the classifier model 602 considers the target sequence 508 to be true. In some embodiments, for each target sequence 508 that the classifier model 602 evaluates, the classifier model 602 outputs an associated score (e.g., confidence value) that represents the reliability of the target sequence 508. In certain embodiments the score may be an integer between 1 and 100, where lower numbers are associated with relatively little reliability, and higher numbers are associated with relatively greater reliability. For instance, if the trained model 504 received a sentence stating "Texas' fourth largest city is Austin, which is also the state capital" and output a target sequence 508 indicating <Austin (city), capital of, Texas (state)>, the classifier model 602 may recognize this fact as being highly likely to be correct and output a relatively high score of 90, whereas if the trained model 504 received a sentence stating "Austin, which is also the county seat, has a capitol building on San Jacinto" and output a target sequence 508 indicating <Austin (city), county seat of, San Jacinto (county)>, the classifier model 602 may recognize this to be likely to be incorrect and output a relatively low score of 10.

Figure 7:
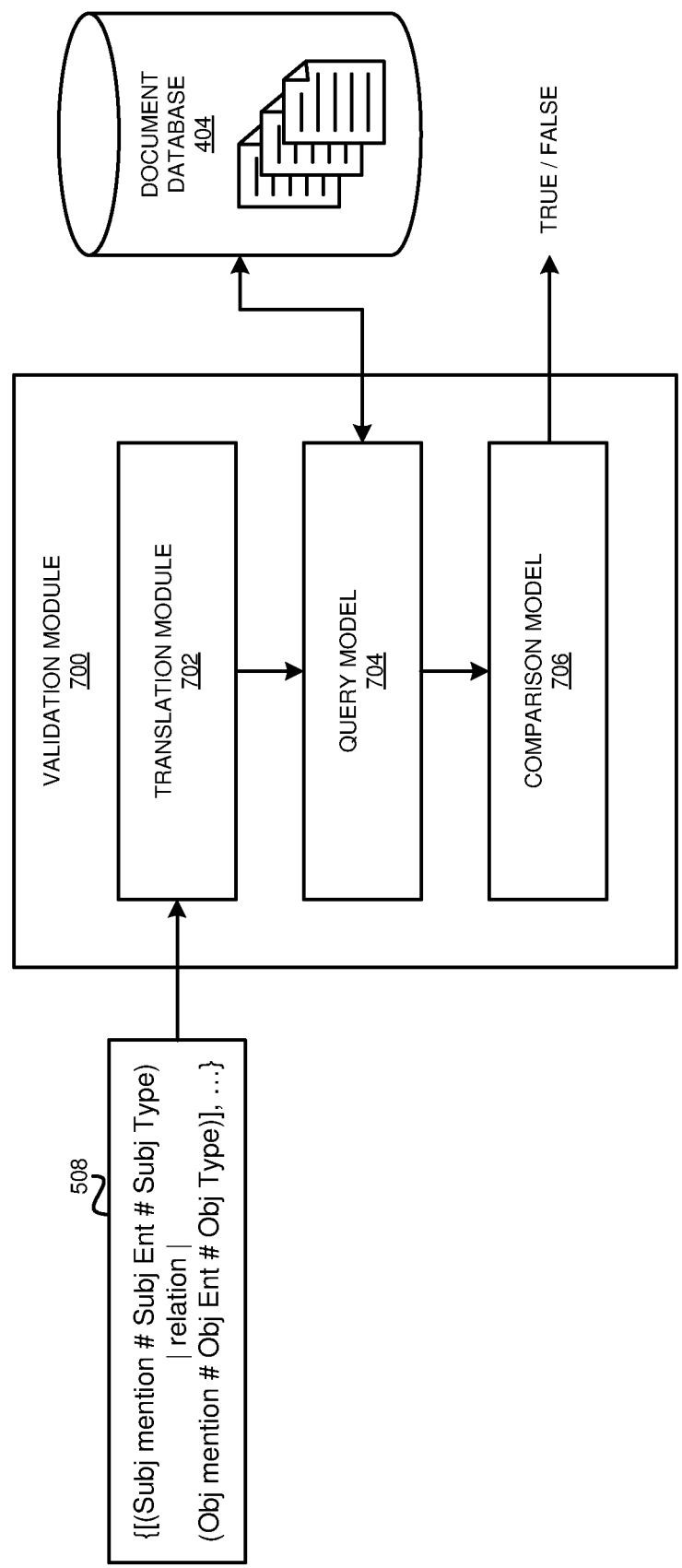
FIG. 7 depicts a functional block diagram of an exemplary validation module in accordance with an illustrative embodiment.

With reference to FIG. 7, this figure depicts a functional block diagram of an exemplary validation module 700 in accordance with an illustrative embodiment. In the illustrated embodiment, the validation module 700 is an alternative to the validation module 600. The validation module 700 uses a translation module 702, query module 704, and comparison module 706 to validate a target sequence 508 output by the knowledge generation module 304.

In the illustrated embodiment, the translation module 702 translates the content of the target sequence 508 into a natural language statement. The translation module 702 sends the natural language statement to the query module 704. The query module 704 then issues a query to the document database 404 for natural language matching, or similar to, natural language statement. The document database 404 responds with one or more strings of text that are closest to the natural language statement.

The response from the document database 404 is provided to the comparison module 706 along with the natural language statement. The comparison module 706 then compares the natural language statement to the string(s) of text returned by the document database 404 to determine a degree of similarity between the two. In some embodiments, the comparison module 706 encodes the natural language statement into a feature vector of numerical values and encodes each of the string(s) of text returned by the document database 404 into vectors of numerical values. In some such embodiments, the comparison module 706 compares the feature vector to the vector representations of the string(s) of text returned by the document database 404 and generates an output score based on a proximity between the feature vector and a closest one of the vector representations of the string(s) of text returned by the document database 404, where the proximity may be determined using a known technique, such as cosine similarity or Euclidean distance. In some embodiments, the comparison module 706 then compares the output score to a threshold value where, for example, if the output score exceeds the threshold value, the target sequence 508 is designated as valid (output TRUE); otherwise, the target sequence 508 is designated as invalid (output FALSE).

Figure 8:
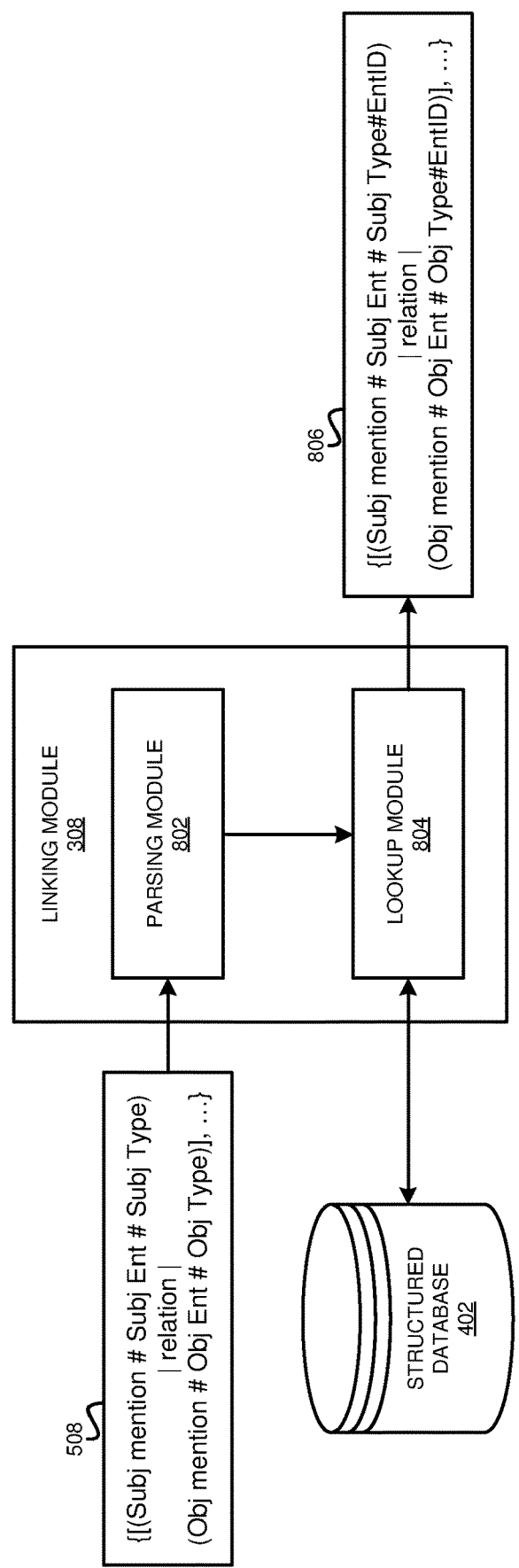
FIG. 8 depicts a functional block diagram of an exemplary linking module in accordance with an illustrative embodiment.

With reference to FIG. 8, this figure depicts a functional block diagram of an exemplary linking module 308 in accordance with an illustrative embodiment. In the illustrated embodiment, the linking module 308 links a target sequence 508 generated by the knowledge generation module 304 with a knowledge base stored in a structured database 402.

In the illustrated embodiment, the linking module 308 includes a parsing module 802 and a lookup module 804. In alternative embodiments, the linking module 308 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In some embodiments, the linking module 308 enables retrieving identifiers from a structured database 402 that are associated with the generated entity, type, and relation labels of the target sequence 508. For example, in some embodiments, the linking module 308 enables retrieving Wikidata IDs associated with the generated entity, type and relation labels. Specifically, in the illustrated embodiment, the parsing module 802 parses the target sequence 508 to identify the named entities and provides the named entities to the lookup module 804. The lookup module 804 then queries the structured database 402 for identifiers associated with each of the named entities, along with the associated type and relation labels. In the illustrated embodiment, the lookup module 804 then generates a target sequence 806, which is an updated version of the target sequence 508 with the retrieved identifiers appended thereto. In some embodiments, the lookup module 804 creates a label-to-identifier map and stores the map in a key-value data storage system stored on a computer readable storage medium to avoid bottlenecks caused by running multiple queries to the structured database 402. In some embodiments, the lookup module 804 can generate new identifiers for the entity, type, or relation labels that are not in the structured database 402. In this case, the lookup module 804 receives a null ID from the structured database 402 indicating that the target sequence 508 can be used as a candidate for adding new facts in the structured database 402.

Figure 9:
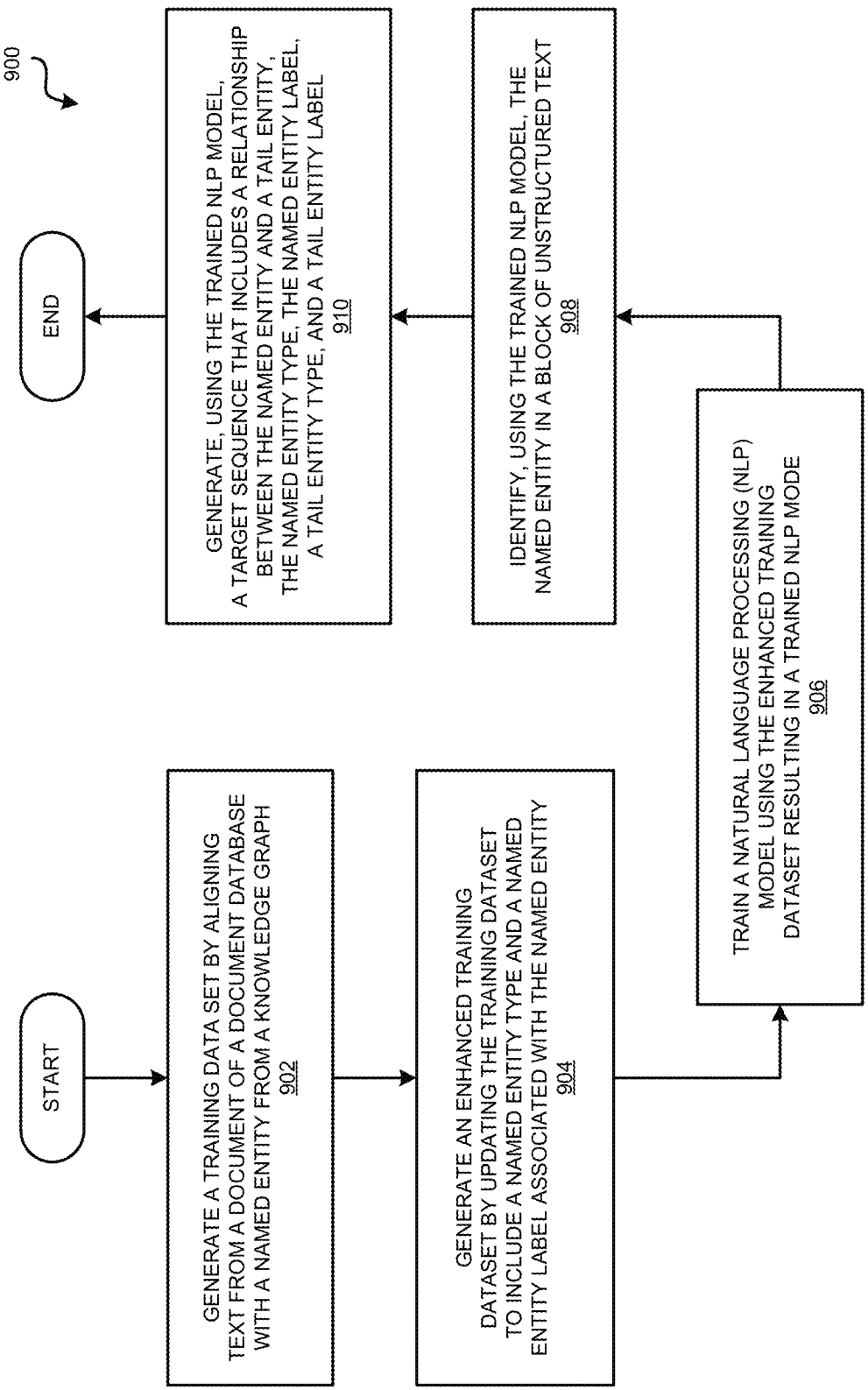
FIG. 9 depicts a flowchart of an example process for automatically generating semantic triplets from unstructured text in accordance with an illustrative embodiment.

With reference to FIG. 9, this figure depicts a flowchart of an example process 900 for automatically generating semantic triplets from unstructured text in accordance with an illustrative embodiment. In a particular embodiment, the information extraction module 200 carries out the process 900.

At block 902, the process generates a training dataset by aligning text from a document of a document database with a named entity from a knowledge graph. In some embodiments, the process uses a distance supervision technique that automatically aligns text from documents of the document database with named entities from the knowledge base. In some such embodiments, the distance supervision technique automatically aligns text from documents of the document database with semantic triplets from the knowledge base, where the semantic triplets include named entities as subject entities and object entities of the semantic triplets.

Next, at block 904, the process generates an enhanced training dataset by updating the training dataset to include a named entity type and a named entity label associated with the named entity. In some embodiments, the process generates the enhanced training dataset using a distance supervision technique that automatically updates the training dataset to include the named entity type and the named entity label. In some such embodiments, the distance supervision technique automatically updates the training dataset by querying the knowledge base for the named entity, retrieving the named entity type and the named entity label from the knowledge base, and associating the named entity type and the named entity label with the named entity.

Next, at block 906, the process trains a natural language processing (NLP) model using the enhanced training dataset resulting in a trained NLP mode. In some embodiments, the NLP model comprises a sequence-to-sequence model comprising an encoder and a decoder.

Next, at block 908, the process identifies, using the trained NLP model, the named entity in a block of unstructured text. In some embodiments, the block of unstructured text is a sentence. In some such embodiments, the process extracts the sentence from the unstructured text.

Next, at block 910, the process generates, using the trained NLP model, a target sequence that includes a relationship between the named entity and a tail entity, the named entity type, the named entity label, a tail entity type, and a tail entity label. In some embodiments, the process generates of the target sequence by using the encoder to generate a numeric representation of a word from the block of unstructured text, and then using the decoder to generate the target sequence as a prediction of the relationship based at least in part on the numeric representation of the word. In some embodiments, the process formats the target sequence according to a predefined schema that specifies an arrangement of the target sequence. In some embodiments, the predefined schema specifies the arrangement to include the named entity, followed by the named entity type, followed by the named entity label, followed by the relationship, followed by the tail entity, followed by the tail entity type, and followed by the tail entity label.

In some embodiments, the process then validates the target sequence. In some such embodiments, the process validates the target sequence using a classifier model that analyzes the relationship and outputs an indication of an accuracy of the relationship. In some alternative embodiments, the process validates the target sequence by translating the target sequence into a natural language statement, issuing a query to the document database for a string of text that matches, or is similar to, the natural language statement, and then generating a validation result based on a comparison of the natural language statement to the query result.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    generating a training dataset by aligning text from a document of a document database with a named entity from a knowledge base;
    generating an enhanced training dataset by updating the training dataset to include a named entity type and a named entity label associated with the named entity;
    training a natural language processing (NLP) model using the enhanced training dataset resulting in a trained NLP model;
    identifying, using the trained NLP model, the named entity in a block of unstructured text;
    generating, using the trained NLP model, a target sequence that includes a relationship between the named entity and a tail entity, wherein the target sequence includes the named entity type and the named entity label of the named entity and includes a tail entity type and a tail entity label of the tail entity;
    validating the target sequence by translating the target sequence comprising semantic annotations into a natural language statement;
    issuing a query to the document database, wherein the query comprises the natural language statement;
    generating, responsive to receiving a query result from the document database in response to the query, a validation result based on a comparison of the natural language statement to the query result;
    wherein the NLP model comprises a sequence-to-sequence model comprising an encoder and a decoder, generating, using the encoder, a numeric representation of a word from the block of unstructured text, generating, using the decoder, the target sequence as a prediction of the relationship based at least in part on the numeric representation of the word; and
    further comprising validating the target sequence using a classifier model that analyzes the relationship and outputs an indication of an accuracy of the relationship.

2. The computer-implemented method of claim 1, further comprising:
    validating the target sequence using the classifier model that analyzes the relationship and outputs a probability of the accuracy of the relationship based on a proximity between a feature vector of the target sequence and a vector representation of a triple from a structured database.

3. The computer-implemented method of claim 1, wherein the generating of the training dataset comprises using a distance supervision technique that automatically aligns text from documents of the document database with pairs of entities from the knowledge base, wherein each pair of entities comprises a named entity and a tail entity.

4. The computer-implemented method of claim 3, wherein the distance supervision technique automatically aligns text from documents of the document database with semantic triplets from the knowledge base, wherein the semantic triplets include named entities as subject entities and object entities of the semantic triplets.

5. The computer-implemented method of claim 1, wherein the generating of the enhanced training dataset comprises using a distance supervision technique that automatically updates the training dataset to include the named entity type and the named entity label.

6. The computer-implemented method of claim 5, wherein the distance supervision technique automatically updates the training dataset by querying the knowledge base for the named entity, retrieving the named entity type and the named entity label from the knowledge base, and associating the named entity type and the named entity label with the named entity.

7. The computer-implemented method of claim 6, wherein the block of unstructured text is a sentence, and wherein the method further comprises extracting the sentence from the unstructured text.

8. The computer-implemented method of claim 1, wherein the NLP model comprises a sequence-to-sequence model comprising an encoder and a decoder.

9. The computer-implemented method of claim 1, wherein the generating of the target sequence by the decoder comprises formatting the target sequence according to a predefined schema that specifies an arrangement of the target sequence.

10. The computer-implemented method of claim 9, wherein the predefined schema specifies the arrangement to include the named entity, followed by the named entity type, followed by the named entity label, followed by the relationship, followed by the tail entity, followed by the tail entity type, and followed by the tail entity label.

11. A computer program product comprising one or more computer readable storage media, and program instructions collectively stored on the one or more computer readable storage media, the program instructions executable by a processor to cause the processor to perform operations comprising:
  generating a training dataset by aligning text from a document of a document database with a named entity from a knowledge base;
  generating an enhanced training dataset by updating the training dataset to include a named entity type and a named entity label associated with the named entity;
  training a natural language processing (NLP) model using the enhanced training dataset resulting in a trained NLP model;
  identifying, using the trained NLP model, the named entity in a block of unstructured text;
  generating, using the trained NLP model, a target sequence that includes a relationship between the named entity and a tail entity, wherein the target sequence includes the named entity type and the named entity label of the named entity and includes a tail entity type and a tail entity label of the tail entity;
  validating the target sequence by translating the target sequence comprising semantic annotations into a natural language statement;
  issuing a query to the document database, wherein the query comprises the natural language statement;
  generating, responsive to receiving a query result from the document database in response to the query, a validation result based on a comparison of the natural language statement to the query result;
  wherein the NLP model comprises a sequence-to-sequence model comprising an encoder and a decoder, generating, using the encoder, a numeric representation of a word from the block of unstructured text, generating, using the decoder, the target sequence as a prediction of the relationship based at least in part on the numeric representation of the word; and
  further comprising validating the target sequence using a classifier model that analyzes the relationship and outputs an indication of an accuracy of the relationship.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
  program instructions to meter use of the program instructions associated with the request; and
  program instructions to generate an invoice based on the metered use.

14. The computer program product of claim 11, wherein the generating of the enhanced training dataset comprises using a distance supervision technique that automatically updates the training dataset to include the named entity type and the named entity label.

15. The computer program product of claim 14, wherein the distance supervision technique automatically updates the training dataset by querying the knowledge base for the named entity, retrieving the named entity type and the named entity label from the knowledge base, and associating the named entity type and the named entity label with the named entity.

16. A computer system comprising a processor and one or more computer readable storage media, and program instructions collectively stored on the one or more computer readable storage media, the program instructions executable by the processor to cause the processor to perform operations comprising:
  generating a training dataset by aligning text from a document of a document database with a named entity from a knowledge base;
  generating an enhanced training dataset by updating the training dataset to include a named entity type and a named entity label associated with the named entity;
  training a natural language processing (NLP) model using the enhanced training dataset resulting in a trained NLP model;
  identifying, using the trained NLP model, the named entity in a block of unstructured text;
  generating, using the trained NLP model, a target sequence that includes a relationship between the named entity and a tail entity, wherein the target sequence includes the named entity type and the named entity label of the named entity and includes a tail entity type and a tail entity label of the tail entity;

validating the target sequence by translating the target sequence comprising semantic annotations into a natural language statement;

issuing a query to the document database, wherein the query comprises the natural language statement;

generating, responsive to receiving a query result from the document database in response to the query, a validation result based on a comparison of the natural language statement to the query result;

wherein the NLP model comprises a sequence-to-sequence model comprising an encoder and a decoder, generating, using the encoder, a numeric representation of a word from the block of unstructured text, generating, using the decoder, the target sequence as a prediction of the relationship based at least in part on the numeric representation of the word; and further comprising validating the target sequence using a classifier model that analyzes the relationship and outputs an indication of an accuracy of the relationship.

17. The computer system of claim 16, wherein the generating of the enhanced training dataset comprises using a distance supervision technique that automatically updates the training dataset to include the named entity type and the named entity label.

18. The computer system of claim 17, wherein the distance supervision technique automatically updates the training dataset by querying the knowledge base for the named entity, retrieving the named entity type and the named entity label from the knowledge base, and associating the named entity type and the named entity label with the named entity.

* * * * *